H. F. BUSCH.
METHOD OF MAKING COMPOSITE CORKS.
APPLICATION FILED DEC. 30, 1915.
1,209,259. Patented Dec. 19, 1916.
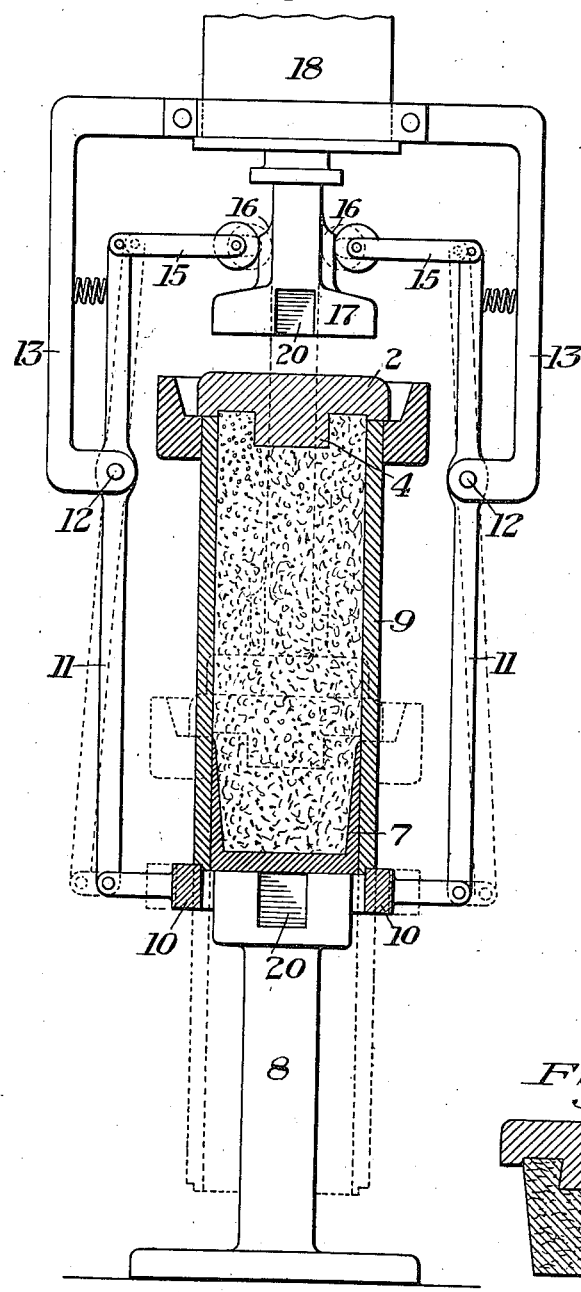
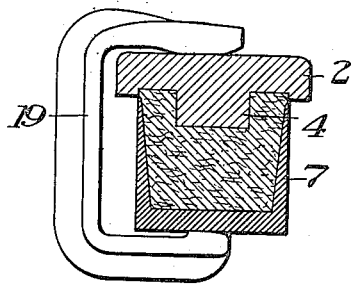
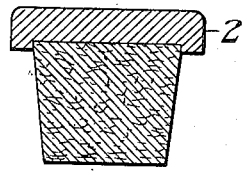
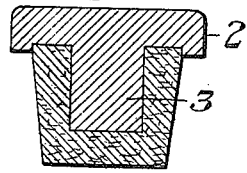
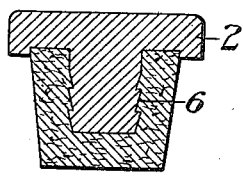
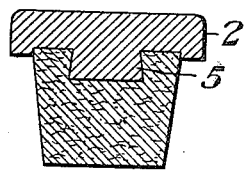
WITNESSES
R A Balderson
G. B. Bleming
INVENTOR
H. F. Busch

UNITED STATES PATENT OFFICE.

HERMAN F. BUSCH, OF MILLVALE, PENNSYLVANIA, ASSIGNOR TO ARMSTRONG CORK COMPANY, OF PITTSBURGH, PENNSYLVANIA, A CORPORATION OF PENNSYLVANIA.

METHOD OF MAKING COMPOSITE CORKS.

1,209,259.  Specification of Letters Patent.  Patented Dec. 19, 1916.

Application filed December 30, 1915. Serial No. 69,365.

*To all whom it may concern:*

Be it known that I, HERMAN F. BUSCH, a citizen of the United States, residing at Millvale, Allegheny county, Pennsylvania, have invented a new and useful Method of Making Composite Corks, of which the following is a full, clear, and exact description, reference being had to the accompanying drawings, forming part of this specification, in which—

Figure 1 is a view partly in front elevation, and partly in vertical section, of one form of apparatus which may be used in the practice of my invention. Fig. 2 is a sectional elevation showing one of the completed corks clamped in its mold, and Figs. 3, 4, 5 and 6 are sectional views showing different forms of the completed corks.

My invention has relation to composite corks having a head portion of wood, and a body portion of cork material, and to a novel method of making the same.

Heretofore, in so far as I am aware, in the manufacture of composite corks of this character, the body member has been cut from a piece of natural cork. This operation requires considerable work and results in a large percentage of waste cork, which increases the cost of the completed articles.

One object of my invention is to provide a cork of this character in which the body, instead of being of natural cork, is composed of compressed artificial cork, consisting of cork granules and a suitable binder.

A further object of my invention is to provide a simple method of making corks of the above described character whereby they can be manufactured rapidly and cheaply, the wooden head members of the corks acting as a part of the mold for the formation of the artificial cork body portion.

In carrying out my invention, I provide the previously formed wooden top members 2, which may be of the usual character. Instead, however, of forming a long stud portion 3, as shown in Fig. 4, and which is usually provided where natural cork is employed, I may considerably shorten this stud, as indicated at 4 in Fig. 1; or I may omit it entirely, as shown in Fig. 3; or I may shorten it and make it of somewhat dovetail form as shown at 5 in Fig. 6; or I may provide it with corrugations or notches of any suitable character, as indicated at 6 in Fig. 5, in order to more effectively retain the cork body thereon. This wooden top member I use as one element of a forming mold. The other coöperating element of the mold may be a member such as shown at 7 in Fig. 1, which is removably placed upon a fixed support 8 adapted to fit loosely within the lower end portion of a vertically movable cylinder 9. This cylinder 9 at its upper end is arranged to seat the wooden top 2 in the manner shown, after the cylinder has been filled with the cork mixture. This mixture may be of any suitable character, such, for instance, as that employed in the manufacture of the sealing disks of artificial cork which are now largely used in the well known "crown" stoppers. During the filling operation the cylinder 9 may be supported at its lower end upon the sectional rings 10 supported by the upwardly extending levers 11 pivoted at the points 12 on a suitable frame 13, and provided at their upper ends with roller carrying arms 15 adapted to engage cam surfaces 16 on a vertically movable plunger 17. After the mold member 7 has been placed within the lower portion of the cylinder, and the cylinder has been filled with the mixture, the wooden top member 2 is placed in position, and the plunger 17 is then operated in any suitable manner, as by a power cylinder 18. As this plunger descends it forces the wood top 2, together with the cylinder 9 downwardly, compressing the cork mixture between the wood top 2 and the mold member 7, the cams 16 operating to separate the supporting ring 7 and permit the downward movement of said cylinder. The mixture is thus compressed within the mold member 7 and against and upon the wood top 2, until the article is formed as shown in Fig. 2. A suitable clamp 19 is then applied to hold the parts together, the lower support 8 and the plunger 17 being cut away, as indicated at 20, to permit the application of the arms of this clamp. The articles while clamped in this position are then taken to a suitable baking oven and baked while confined by the clamps. When the baking operation is completed the clamps are removed, together with the mold members 7, thus leaving the finished articles ready for use.

In accordance with my invention, I am able to produce composite corks of this character which are, in fact, superior to those employing the natural cork and which can be manufactured and sold at a very much lower cost. Owing to the pressure which is employed, cork bodies are made which are more dense than natural cork; and which are free from faults which occur in natural cork. At the same time by the use of suitable artificial cork mixtures such as are now well known in the arts, a cork body is produced which is permanently elastic and in every way suited for this particular purpose.

The apparatus which I have herein shown and described forms no part of my present invention, since any suitable apparatus may be employed. My invention, however, contemplates the use of the top wood member of the corks as a part of the forming mold, the cork body portion being simultaneously formed upon and united to the top member. Instead of a wooden top member, I may, of course, employ any other suitable material.

I claim:

1. The herein described method of making composite corks, which consists in compressing a cork mixture between two mold members, one of said mold members being a part of the finished cork, substantially as described.

2. The method of making composite corks, which consists in placing a charge of cork mixture in a container having a mold member at one end, placing the pre-formed top member of a finished cork at the opposite side of the charge, and then moving the top member and the mold member relatively to each other to compress the charge mixture and thereby form the body portion of the composite cork directly upon the top member, substantially as described.

3. The method of making composite corks, which consists in placing a charge of cork mixture in a container having a mold member at one end, placing the pre-formed top member of a finished cork at the opposite side of the charge, then moving the top member and the mold member relatively to each other to compress the charge mixture and thereby form the body portion of the composite cork directly upon the top member, and finally baking the finished article, substantially as described.

4. The method of making composite corks, which consists in placing a charge of cork mixture in a container having a mold member at one end, placing the pre-formed top member of a finished cork at the opposite side of the charge, then moving the top member and the mold member relatively to each other to compress the charge mixture and thereby form the body portion of the composite cork directly upon the top member, and finally baking the finished article while still confined by said mold member, substantially as described.

5. The herein described method of forming composite corks, which consists in providing a top member, and compressing and shaping a mixture of plastic material against and upon said top member, substantially as described.

6. The herein described method of forming composite corks, which consists in providing a top member, compressing and shaping a mixture of cork material against and upon said top member, and then baking the article with the formed body confined to shape, substantially as described.

7. The herein described method of forming composite corks, which consists in utilizing the top member of the finished cork as an element of a forming and shaping mold, and then compressing and shaping a mixture of plastic material upon and against said top member, substantially as described.

8. The herein described method of forming composite corks, which consists in utilizing the top member of the finished cork as an element of a forming and shaping mold, then compressing and shaping a mixture of plastic material upon and against said top member, and then baking the article, substantially as described.

In testimony whereof I have hereunto set my hand.

HERMAN F. BUSCH.

Witnesses:
Geo. B. Bleming,
Geo. H. Parmelee.